United States Patent [19]

Ootsuka et al.

[11] Patent Number: 4,626,656

[45] Date of Patent: Dec. 2, 1986

[54] METHOD AND APPARATUS FOR INDICATING THE CONTACT STRUCTURE OF ELECTROMAGNETIC CONTACTOR ON THE HOUSING THEREOF USING LASER LIGHT

[75] Inventors: Shigeharu Ootsuka, Kagamihara; Yuji Mizuno, Nagoya; Junichi Kajimura, Kani; Takaaki Mori, Mie, all of Japan

[73] Assignee: Mitsubishi Denki Kabushiki Kaisha, Tokyo, Japan

[21] Appl. No.: 756,320

[22] Filed: Jul. 18, 1985

[30] Foreign Application Priority Data

Jul. 19, 1984 [JP] Japan ................. 59-148530

[51] Int. Cl.$^4$ .............................. B23K 26/00
[52] U.S. Cl. .................. 219/121 LH; 219/121 LJ; 219/121 LP; 219/121 LY; 346/76 L; 364/474
[58] Field of Search ...... 219/121 L, 121 LM, 121 LJ, 219/121 LH, 121 LP, 121 LY; 346/76 L; 364/474

[56] References Cited

U.S. PATENT DOCUMENTS

| | | | |
|---|---|---|---|
| 3,518,925 | 7/1970 | Chitayat | 219/121 LH |
| 4,128,752 | 12/1978 | Gravel | 219/121 LH |
| 4,323,317 | 4/1982 | Hasegawa | 219/121 LH X |
| 4,323,755 | 4/1982 | Nierenberg | 219/121 LJ |
| 4,517,436 | 5/1985 | Lawrence | 219/121 LH |

FOREIGN PATENT DOCUMENTS

| | | |
|---|---|---|
| 43-8548 | 4/1968 | Japan . |
| 48-29438 | 9/1973 | Japan . |
| 52-10525 | 9/1977 | Japan . |
| 58-15232 | 3/1983 | Japan . |

Primary Examiner—C. L. Albritton
Attorney, Agent, or Firm—Leydig, Voit & Mayer, Ltd.

[57] ABSTRACT

A method and apparatus for indicating the contact structure of an electromagnetic contactor on the housing thereof using laser light is disclosed. The contact structure of a contactor to be marked with terminal numbers or the like is detected by a checking device. Based on the results of checking, a mask selector selects a suitable mask and positions it in the optical path of a laser. Laser light is shined through the mask onto the housing of the contactor. The laser light which passes through the mask and strikes the housing produces discoloration of the housing, and extremely clear terminal numbers, name plates, or other information in the form of characters, symbols, or shapes can be marked on the housing with the laser light. In addition to determining the contact structure, the checking device determines whether the contacts are faulty.

5 Claims, 5 Drawing Figures

METHOD AND APPARATUS FOR INDICATING THE CONTACT STRUCTURE OF ELECTROMAGNETIC CONTACTOR ON THE HOUSING THEREOF USING LASER LIGHT

BACKGROUND OF THE INVENTION

The present invention relates to a method and an apparatus for indicating the contact structure of an electromagnetic contactor on the housing thereof by burning numbers or other characters into the housing using laser light. In the present invention, the term "electromagnetic contactor" refers in particular but not exclusively to small-sized contactors such as electromagnetic relays.

FIG. 1 is a perspective view of a typical electromagnetic contactor of the type to which the present invention is directed, and FIG. 2 is a plan view of the same. In the figures, element number 1 is a contactor having an unillustrated movable core, a movable contact, a contact mechanism, and the like housed therein. Element number 2 is the housing of the contactor, the housing 2 having a plurality of electrically insulating barriers 3 secured to the top portion thereof on both of its sides. The insulating barriers 3 and the rest of the housing 2 are usually made of a phenolic resin. Between each barrier 3, fixed contacts 4 are secured to the housing 2 of the contactor 1 by screws 5 such that their contact surfaces which are contained within the housing 2 of the contactor 1 confront the contact surfaces of the above-mentioned movable contact. Element number 6 is a control terminal secured to the housing 2 of the contactor 1 by a screw 7. Via this control terminal 6, current is supplied to an unillustrated electromagnetic within the housing 2 which operates the movable contact of the contactor 1. As shown in FIG. 2, there is one control terminal 6 provided on each side of the contactor 1 at opposite ends. Elements number 8 and 9 are name plates which indicate the rating and other characteristics of the contactor 1.

This type of contactor 1 generally contains both normally open contacts, which close when the unillustrated electromagnet of the contactor 1 is energized, and normally closed contacts, which close when the electromagnet is energized. In recent years, it has become common to indicate the type of contacts (normally open or normally closed) contained within a contactor 1 by marking terminal numbers 10 on the electrically insulating barriers 3 adjoining the corresponding fixed contacts 4. The terminal numbers 10 are generally two-digit numbers, the last digit of which indicates the type of contact. For example, a two-digit number ending in a 1 or a 2 such as 21 or 22 indicates a normally closed contact, while one ending in a 3 or a 4 such as 13 or 14 indicates a normally open contact. As shown in FIG. 2, each fixed contact 4 is located directly opposite from a contact 4 of the same type on the opposite side of the contactor 1.

In the past, these terminal numbers 10 have been marked on the insulating barriers 3 by printing with ink. However, printing poses a number of difficulties. If the terminal numbers 10 are printed on the insulating barriers 3 prior to assembly of the contactor 1, great care must be taken during assembly to ensure that an insulating barrier 3 bearing the correct terminal number 10 is disposed next to the corresponding type of fixed contact 4. In the example shown in FIG. 2, since there are 8 different terminal numbers 10, this means that there are 8 different types of insulating barriers 3 which can be distinguished only by number. Assembly thus becomes complicated and costly, and improper assembly can easily take place. Furthermore, as the contents of the name plates 8 and 9 vary depending upon the combination of fixed contacts 4 in the contactor 1, a large different number of name plates must be prepared, making assembly even more complicated and increasing the chances of improper assembly increase.

On the other hand, if the terminal numbers 10 and the name plates 8 and 9 are printed on the housing 2 of a completely assembled contactor 1, the printing process itself becomes complicated; since the top surfaces of the insulating barriers 3 are not level, printing of the terminal numbers 10 and the name plates 8 and 9 generally has to be performed in 4 different steps, a different step being required for each of the name plates 8 and 9 and for the terminal numbers 10 on both sides of the contactor 1.

Furthermore, when the terminal numbers 10 and name plates 8 and 9 are printed on the housing 2, much preparatory time is required for the printing itself, for the maintenance of ink, and for the interchanging of printing blocks, and it is possible for the printed characters to be smudged or erased should they come into contact with some object before they are dry.

SUMMARY OF THE INVENTION

It is an object of the present invention to overcome the above-described problems and to provide a method and an apparatus for indicating terminal numbers and the like on the housing of an electromagnetic contactor without the use of printing.

It is another object of the present invention to provide a method and an apparatus which can indicate terminal numbers and the like on the housing of a nearly completely assembled electromagnetic contactor.

It is yet another object of the present invention to provide an apparatus which can automatically distinguish the type of contacts contained in an electromagnetic contactor and indicate the appropriate terminal numbers and the like on the housing thereof.

It is a further object of the present invention to provide an apparatus which can automatically determine whether an electromagnetic contactor on which terminal numbers are to be printed is defective.

In the present invention, terminal numbers, name plates, and the like are indicated on the housing of an electromagnetic contactor by being burned into the housing using a laser instead of by printing. A checking device automatically checks the contact structure of a contactor on which terminal numbers are to be marked, a mask selector responsive to the checking device automatically selects a mask having terminal numbers or other information corresponding to the structure of the contactor which was determined by the checking device and positions the appropriate mask in front of the optical path of a laser, and the laser shines laser light through the mask onto the housing of the contactor, burning terminal numbers, name plates, and other information in the housing.

BRIEF DESCRIPTION OF THE DRAWINGS

In the drawings, the same reference numerals indicate the same or corresponding parts.

DESCRIPTION OF THE PREFERRED EMBODIMENTS

Figure 1:
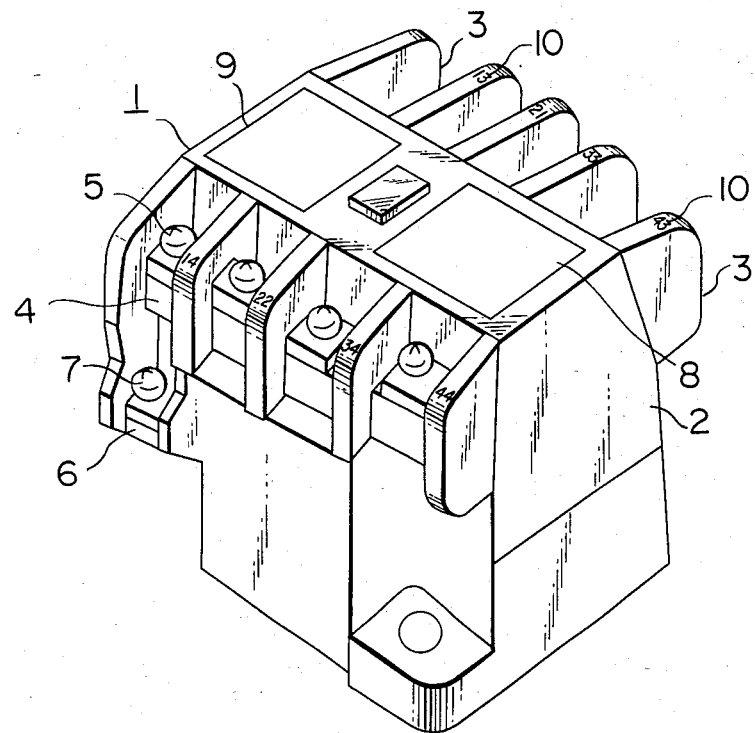
FIG. 1 is a perspective view of a typical electromagnetic contactor of the type to which the present invention relates.
Figure 2:
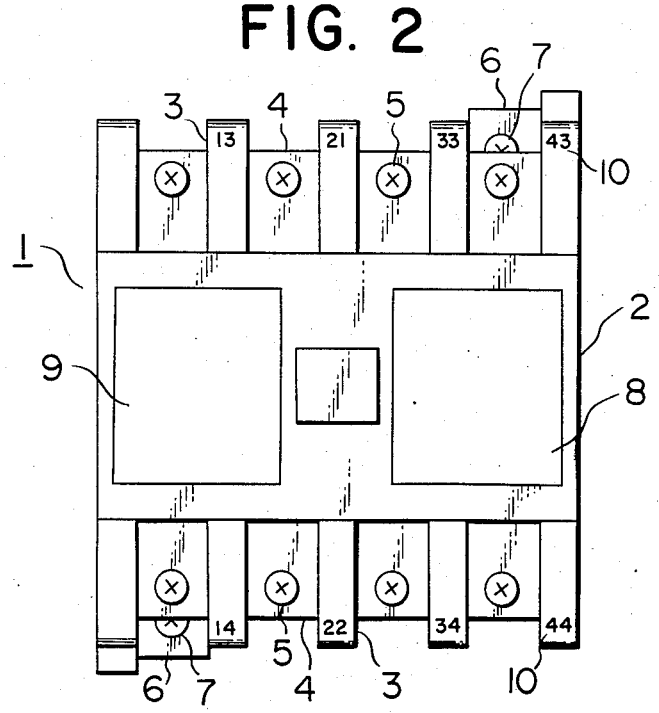
FIG. 2 is a plan view of the contactor illustrated in FIG. 1.
Figure 3:
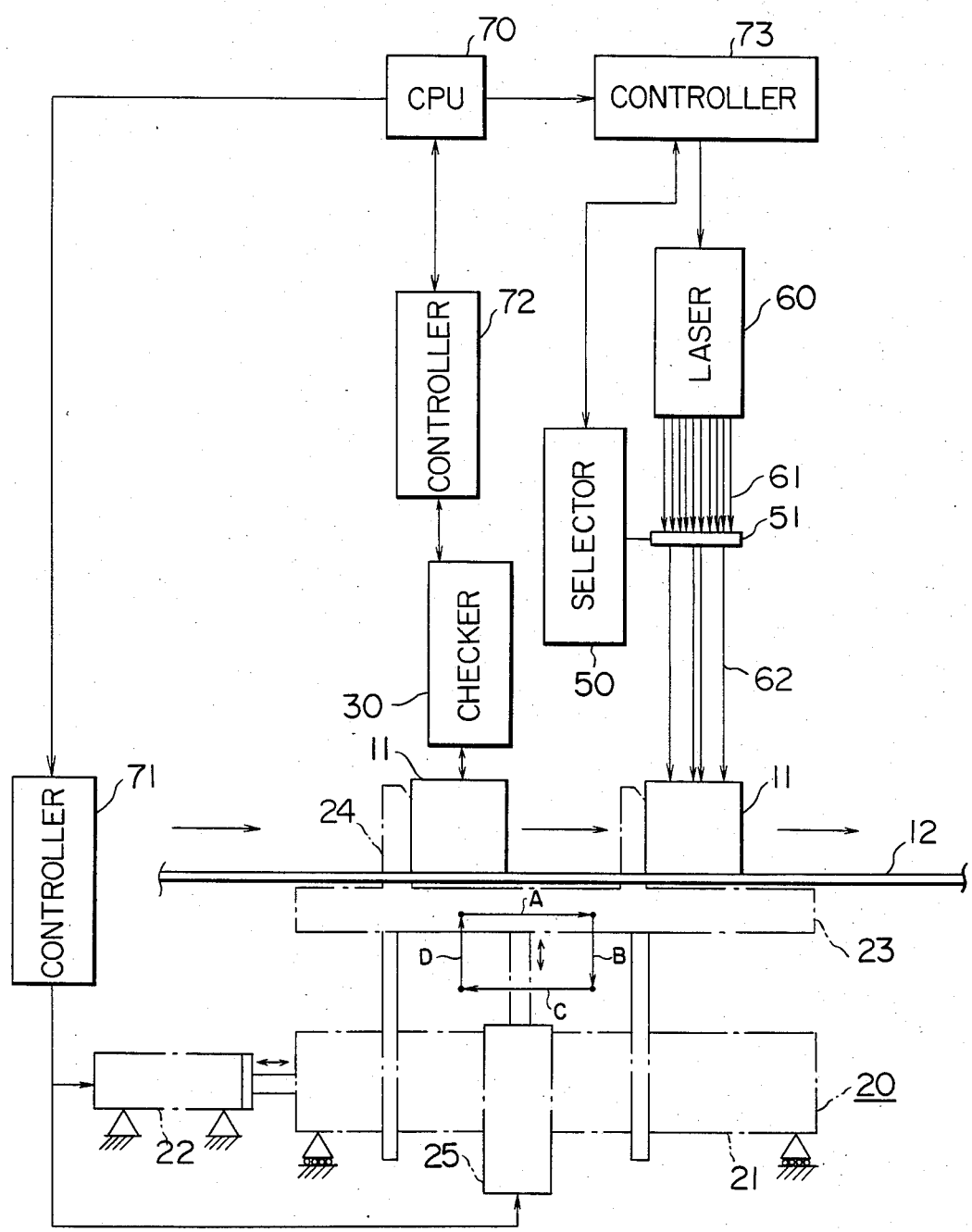
FIG. 3 is a schematic view of an embodiment of an apparatus for indicating terminal numbers and the like according to the present invention.

Preferred embodiments of an apparatus and a method for indicating terminal numbers and the like on the housing of an electromagnetic contactor will now be described while referring to FIGS. 3 through 5 of the accompanying drawings. FIG. 3 is a schematic illustration of an apparatus according to the present invention, showing the functional relationships but not the exact positional relationships between the various parts of the apparatus. In the figure, element number 11 is a nearly completely assembled electromagnetic contactor 11 having basically the same structure as the contactor 1 illustrated in FIG. 1. The contactor 11 is already equipped with all of the parts illustrated in FIGS. 1 and 2 except for the name plates 8 and 9 and the terminal numbers. Element element number 12 is a conveyor belt 12 of an automatic assembly line which moves the contactor 11 to the right in FIG. 3 in the direction of the arrows. The embodiment illustrated in the figure comprises a positioning mechanism 20, a checking device 30 which checks the structure of the contactor 11, a mask selector 50 which selects a suitable mask 51 corresponding to the structure of the contactor 11 and positions it above the contactor 11, a laser 60 which shines laser light onto the top of the contactor 11 through the mask 51 selected by the exchanger 50, and a number of control units 70 through 73 which control the operation of the abovementioned parts. Each of these parts will be described in more detail below.

The positioning mechanism 20 serves to position a contactor 11 at a checking station CS, where the structure of its contacts is checked by the checking device 30, and at a marking station MS, where terminal numbers or the like are burned into the housing of the contactor 11 by the laser 60. The positioning mechanism 20 has a first movable base 21 which is horizontally supported by rollers or other suitable means and which is moved to the left and right in FIG. 3 by a first drive cylinder 22. The first movable base 21 movably supports a second movable base 23 which moves horizontally together with the first movable base 21 and which is driven up and down with respect to the first movable base 21 by a second drive cylinder 25 mounted on the first movable base 21. The second movable base 23 has a number of fingers 24 secured thereto or integrally formed thereon which extend through spaces in the conveyor belt 12. The drive cylinders 22 and 25 drive the bases 21 and 25 so that the second movable base 23 perform movement as indicated by the rectangle ABCD in the middle of FIG. 3. When moving along leg A of the rectangle, the fingers 24 protrude above the surface of the conveyor belt and move a contactor 11 to the right. Along leg B of the rectangle, the second base 23 is moved vertically downwards so that tops of the fingers 24 lie below the conveyor belt 12. Along leg C of the rectangle, the second base 23 is moved to the left together with the first base 21 with the fingers 24 still below the level of the conveyor belt 12, and along leg D, the second base 23 is moved vertically upwards so that the fingers again extend above the surface of the conveyor belt 12 so as to again be able to move a contactor 11 to the right. The operation of the first and second drive cylinders 22 and 25 is controlled by a controller 71.

Figure 4:
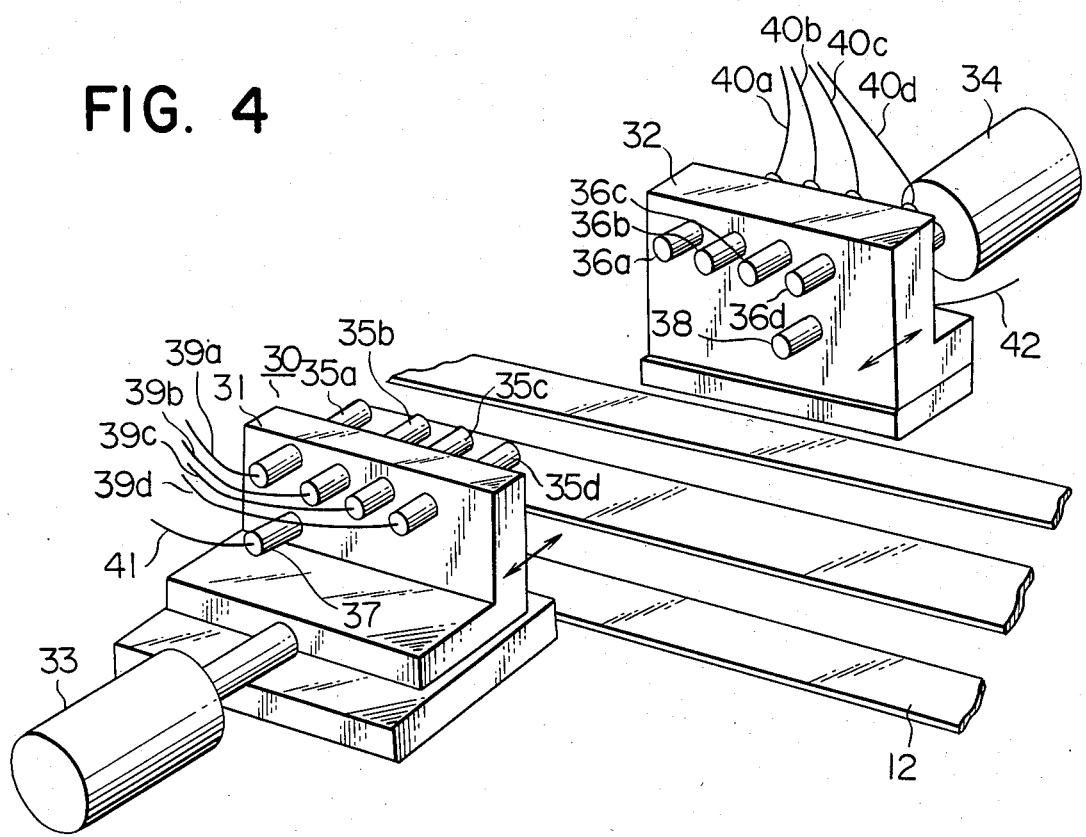
FIG. 4 is a perspective view of an example of a structure checking device for use in the embodiment of FIG. 3.
Figure 5:
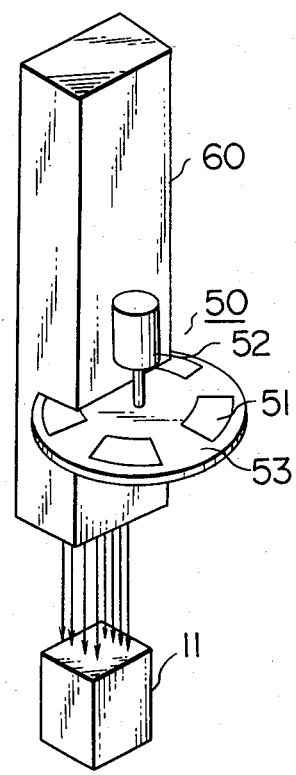
FIG. 5 is an example of a mask selector for use in the embodiment of FIG. 3.

The structure of the checking device 30 is shown in perspective FIG. 4. The checking device 30 has two horizontally movable bases 31 and 32 positioned directly across from one another on opposite sides of the conveyor belt 12. Drive cylinders 33 and 34 which are fixedly mounted on suitable unillustrated frames are connected to the bases 31 and 32, respectively, so that the bases can be moved horizontally towards and away from the conveyor belt 12 by the operation of the drive cylinders 33 and 34. The operation of the drive cylinders 33 and 34 is controlled by a controller 72. Base 31 has four identical input test probes $35a$–$35d$ mounted thereon which correspond to the four fixed contacts 4 on one side of the contactor 11, and base 32 has four identical output test probes $36a$–$36d$ mounted thereon which correspond to the four fixed contacts 4 on the opposite side of the contactor 11. These probes are positioned such that when a contactor 11 is positioned between the two bases 31 and 32 and the bases are moved towards one another, all of the probes will come into electrical contact with the fixed contacts 4 of the contactor 11. Base 31 also has an input current probe mounted thereon in a position corresponding to the control terminal 6 on one side of the contactor 11, and base 32 has an output current probe 38 mounted thereon in a position corresponding to the control terminal 6 on the opposite side of the contactor 11. When the bases 31 and 32 are moved towards one another and the contact test probes come into electrical contact with the fixed contacts 4 of the contactor 11, the current probes 37 and 38 come into electrical contact with the corresponding control terminals 6. Elements $39a$ through $39d$ are input signal lines connected to input test probes $35a$ through $35d$, respectively, and elements $40a$ through $40d$ are output signal lines electrically connected to output test probes $36a$ through $36d$, respectively. Element number 41 is a current input line electrically connected to current probe 37, and element number 42 is a current output line electrically connected to current probe 38. When current is passed through lines 41 and 42, the electromagnet of the contactor 11 is energized, operating the moving contact of the contactor 11. The output signals from the output test probes $36a$–$36d$ are input to the CPU 70 via the controller 72.

The mask selector 50 is a device responsive to the output signals from the checking device 30 via a controller 73, which is controlled by the CPU 70. The CPU 70 sends a control signal to the selector 50 via the controller 73 corresponding to the contact structure of the contactor 11 as determined by the checking device 30, and the selector 50 selects the appropriate mask 51 and positions it in the optical path of the laser 60. In the present embodiment, as shown in FIG. 5, the selector 50 comprises a motor 52 such as a servomotor or a stepping motor having an output shaft on which is mounted a disk 53 which carries a number of masks 51. The masks 51 are conventional masks for use with laser which have shapes in the form of terminal numbers and name plates cut therein, each mask 51 having a different combination of shapes corresponding to the different possible combinations of contacts 4 in the contactors 11. The motor 52 can be rotated so as to position any one of the masks 51 on the disk 53 in the optical path of the laser light from the laser 60. The laser 60 is a conventional laser for industrial use having power sufficient to burn holes in the housing of a contactor 11. The laser 60 is controlled by the above-mentioned controller 73.

The controller 71 for the positioning mechanism 20, the controller 72 for the checking device 30, and the controller 73 for the laser 60 and the mask selector 50 are all controlled by the CPU 70.

The operation of the apparatus illustrated in FIG. 3 will now be described. Partly assembled contactors 11 are intermittently moved along an automatic assembly line by the conveyor belt 12. When a contactor 11 reaches a predetermined position, the conveyor belt 12 is automatically stopped, and the CPU sends an output signal to the controller 71 which operates the positioning mechanism 20 so as to move the contactor 11 to the checking station CS between the two halves of the checking device 30. When the contactor 11 is suitably positioned, the CPU 70 sends a control signal to the controller 72, which operates the drive cylinders 33 and 34 so as to move the bases 31 and 32 together towards the contactor 11 until the test probes and the current probes come into electrical contact with the fixed contacts 4 and the control terminals 6 of the contactor 11. Then, with no current being applied to the input current probe 37, a first test voltage is applied to each of the test probes 35a–35d via the input signal lines 39a–39d. The voltages at the output test probes 36a–36d resulting from the first test voltages are input to the CPU 70 via the output signal lines 40a–40d as data signals. Next, a current is caused to flow through the input current probe 37 and the output current probe 38. As these probes 37 and 38 are connected to the control terminals 6 of the contactor 11, the electromagnet housed inside the contactor 11 which operates the movable contact of the contactor 11 will be energized, causing the normally open contacts to close and the normally closed contacts to open. At this time, a second test voltage is applied to each of the input test probes 35a–35d on base 31, and the resulting output test voltages from the test probes 36a–36d on base 32 are input to the CPU 70 via the controller 72 as data signals.

Based on all of the values of the data signals, both for the first test voltage when the electromagnet inside the contactor 11 is not energized and for the second test voltage when it is, it can be determined whether each of the contacts of the contactor 11 is a normally open contact, a normally closed contact, or whether it is faulty. For example, if the output from test probe 36a is zero in response to the first test voltage (when no current is applied to the current probe 37) and the output is non-zero in response to the second test voltage (when a current is applied to the current probe 37), then the contact between test probes 35a and 36a is a normally open contact. If the output of test probe 36a is non-zero in response to the first test voltage and the output is zero in response to the second test voltage, then the contact between test probes 35a and 36a is a normally closed contact. Furthermore, if the output of test probe 36a is the same in response to both test voltages, the contact between the test probes 36a and 36b is faulty. In the same way, the type and condition of each of the other contacts in the contactor 11 can be determined based on the output signals from the test probes 36a–36d.

It is of course not necessary that a current be applied to the current probe at the time of the second test voltage. The same effects can be obtained by reversing the order and applying a current at the time of the first test voltage and not at the time of the second test voltage.

After checking is completed, the controller 72 activates the drive cylinders 33 and 34 to move the bases 31 and 32 away from the contactor so that the contactor 11 can be moved to the right. After receiving the data signals from the checking device 30, the CPU 70 outputs suitable control signals for the controller 71 for the positioning device 20, which moves the contactor 11 from the checking station CS to the marking station MS located beneath the laser 60. At the same time, it sends control signals to the controller 73 for the mask selector 50 and the laser 60. The controller 73 controls the motor 52 of the selector 50 so as to rotate until the appropriate mask 51 having terminal numbers, name plates, and the like corresponding to the type of contacts in the contactor 11 is located in the optical path of the laser 60. When the contactor 11 and the mask 51 are correctly positioned, the controller 73 controls the laser 60 to emit a laser beam 61 for a suitable length of time. Some of the laser beam 61 is blocked by the mask 51, but a portion 62 passes through the shapes cut in the mask 51 and strikes the top surface of the housing 2 of the contactor 11 in locations where terminal numbers 10 and name plates 8 and 9 are desired. In these locations, shapes corresponding to the shapes cut in the mask 51 are burned into the housing.

As mentioned above, the housing of a contactor is generally made of a black phenolic resin. When illuminated with laser light, the illuminated portions turn yellowish-white. Accordingly, the laser beam 62 which passes through the mask 51 will burn yellowish-white terminal numbers and characters for name plates into the housing of the contactor 11. After the terminal numbers and name plates are burned into the top surface of the housing, the contactor 11 is moved down the assembly line by the conveyor belt 12 and another contactor 11 is brought to the checking station CS.

If the CPU 70 determines based on the data signal from the checking device 30 that the contactor 11 which was checked is faulty, the CPU 70 controls the conveyor belt 12 so as to move the contactor 11 past the marking station MS without being marked by the laser 60, and the faulty contactor 11 is removed from the assembly line.

The numbers or letters produced on the housing of the contactor 11 by the laser beam 62 which passes through the mask 51 are produced almost instantaneously. Unlike with printed characters, no drying time is required, and so there is no possibility of the characters becoming smudged or erased through contact. Furthermore, extremely clear characters even of a very small size can be produced by means of laser light.

Various modification can be made to the above embodiment without altering the effects of the present invention. For example, in the present embodiment, the checking device 30 comprises test probes which come into physical contact with the contacts to be checked. Alternatively, contacts of different types (normally closed and normally open contacts) could be previously marked with different symbols, marks, or colors which would be picked up by a camera positioned above the assembly line, and based on the image from the camera, the type of contact would be automatically determined and a corresponding data signal would be sent to the CPU.

Also, in the above embodiment, the mask selector 50 moves a number of masks 51 along a circular path, and the masks 51 are arranged around a disk 53. However, any means for moving an appropriate mask 51 into the optical path of a laser can be used. For example, the masks 51 could be arranged in a row and moved in a straight line by a motor into the optical path of the laser 60.

Furthermore, in the present invention, the laser 60 is used to mark numbers and letters on the contactor 11, but it is of course possible to produce any type of figure or symbol by using an appropriate mask 51.

In addition, instead of drive cylinders 22, 25, 33, and 34, motors can be used to move the bases 21, 23, 31, and 32, respectively.

Also, it is not necessary that the contactor 11 to be marked have a housing made of a phenolic resin. By suitably adjusting the intensity of the laser light, the present apparatus can be used to mark terminal numbers and the like on other materials as well.

With the present invention, marking of terminal numbers and name plate on a contactor 11 can be performed completely on the assembly line. Since all of the insulating barriers of a contactor are identical until they have terminal numbers 10 marked on them, the number of different parts is reduced, making assembly much simpler, less costly, and much less prone to error. Furthermore, marking of terminal numbers and the like with a laser is much less time consuming than when they are printed, since no drying time is required, and the entire top surface of a contactor can be illuminated in a single stage, even if there are differences in the heights of various portions on which characters are to be marked.

What is claimed is:

1. An apparatus for indicating the contact structure of an electromagnetic contactor on the housing thereof, the electromagnetic contactor having a pair of fixed contacts which can be electrically connected to one another by a moving contact operated by an electromagnet housed within said contactor, comprising:
    checking means for determining the contact structure of an electromagnetic contactor and producing a corresponding output signal;
    a laser;
    a plurality of masks corresponding to the various possible contact structures of said electromagnetic contactor;
    mask selector means responsive to said checking means for selecting a mask from said plurality of masks and positioning the selected mask in the optical path of said laser, the selected mask containing information corresponding to the contactor structure of said electromagnetic contactor as determined by said checking means; and
    means for positioning said electromagnetic contactor in the optical path of laser light from said laser such that laser light passing through the selected mask illuminates appropriate portions of said contactor.

2. An apparatus as claimed in claim 1, wherein said checking means comprises:
    an input test probe and an output test probe;
    means for supporting said input and output test probes and bringing them into electrical contact with said pair of fixed contacts of said contactor, said input test probe being connected to one of the fixed contacts of said pair and said output test probe being connected to the other of said fixed contacts;
    means for energizing said electromagnetic of said contactor so as to operate said moving contact; and
    means for applying a test voltage to said input test probe.

3. An apparatus as claimed in claim 2, further comprising control means for determining whether said pair of fixed contacts is a pair of normally open contacts, a pair of normally closed contacts, or whether the contacts are faulty based on the output signal from said output test probe and controlling said mask selecting means in accordance with the determination.

4. An apparatus as claimed in claim 3, wherein:
    said control means determines that said fixed contacts are normally open contacts if the output of said output test probe in response to said test voltage is zero when said electromagnet is not energized and is non-zero when said electromagnet is energized;
    said control means determines that said fixed contacts are normally closed contacts if the output of said output test probe in response to said test voltage is non-zero when said electromagnet is not-energized and is zero when said electromagnet is energized; and
    said control means determines that said fixed contacts are faulty if the output of said output test probe in response to said test voltage is the same when said electromagnet is energized and when it is not energized.

5. A method for indicating the contact structure of an electromagnetic contactor on the housing thereof comprising the steps of:
    checking the contact structure of a pair of fixed contacts of said contactor;
    based on the result of said checking step, selecting a mask containing information corresponding to said contact structure and positioning said mask in the optical path of a laser such that laser light passing through said mask can illuminate only portions of said housing which are to be marked; and
    shining laser light from said laser through said mask onto said housing so as to discolor the portions of said housing where said laser light strikes, thereby burning the information contained in said mask into said housing.

* * * * *